United States Patent Office.

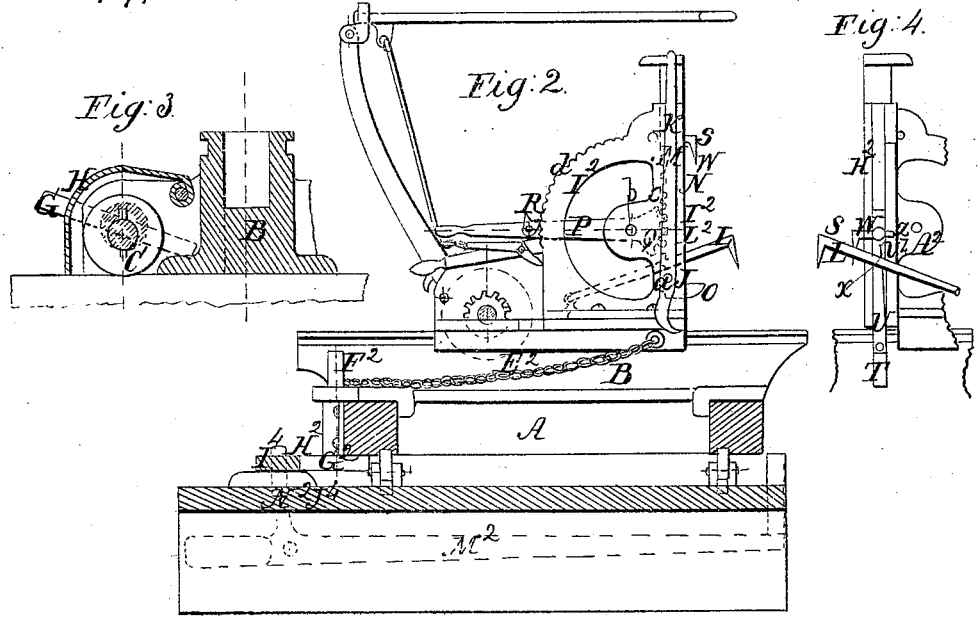
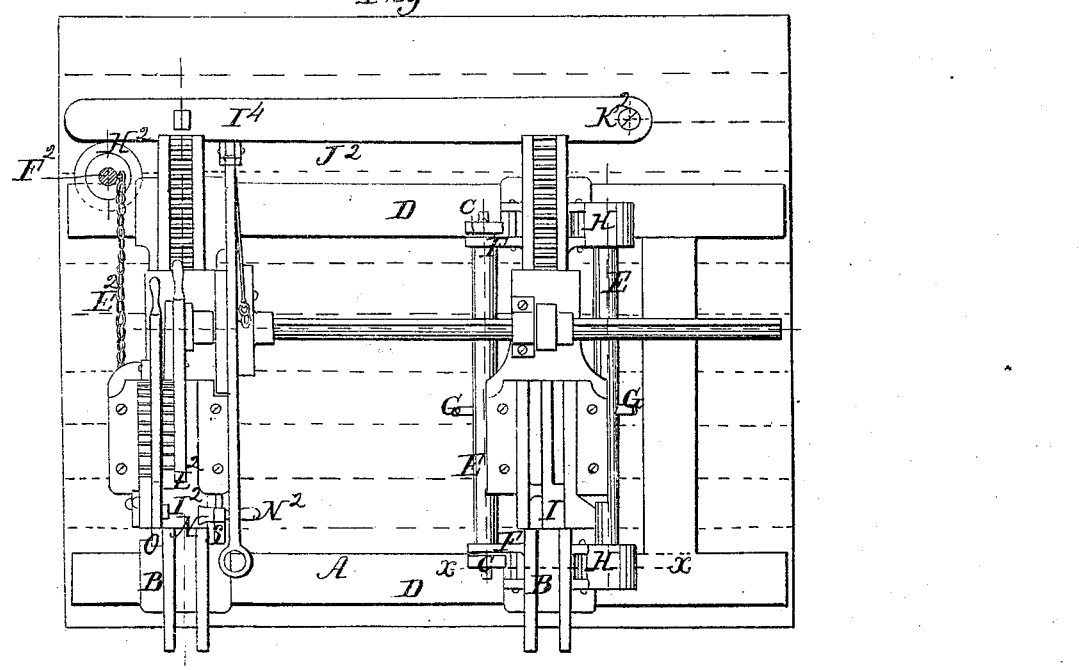

DENNIS LANE, OF MONTPELIER, VERMONT.

Letters Patent No. 79,484, dated June 30, 1868.

IMPROVEMENT IN HEAD-BLOCKS FOR SAW-MILLS.

The Schedule referred to in these Letters Patent and making part of the same.

TO ALL WHOM IT MAY CONCERN:

Be it known that I, DENNIS LANE, of Montpelier, in the county of Washington, and State of Vermont, have invented a new and useful "Improvement in Saw-Mills;" and I do hereby declare that the following is a full, clear, and exact description of the same, reference being had to the annexed drawings, which form part of this specification.

The present invention consists,

First, in providing either one or more of the head-blocks to a saw-mill carriage with rollers or wheels, in suitable position to run upon the carriage from end to end, as the head-blocks are moved or slid along thereon, for adjustment with reference to the log, and in so arranging such rollers or wheels that they can be raised from or lowered to their bearing upon the carriage, according as the head-blocks are to remain stationary, or to be adjusted in position, as above stated.

Second, in providing the head-blocks to a saw-mill carriage with scrapers, brushes, or other devices suitable for scraping or cleaning the carriage over and on which they run, (in advance of the movement of the said blocks, whether in the one or the other direction of the saw-dust, &c., which may have accumulated or become deposited thereon in the running of the mill.) These scrapers, &c., are of much utility, and more especially when the head-blocks are provided with rollers, as in the first part of this invention.

Third, in providing the upright supports to the head-blocks with a dog or dogs, so hung thereon as to be susceptible of being engaged with the log upon its under side, in combination with a dog or dogs, arranged to hold the log upon the upper side. By this combination of dogs the log can be held from rolling around toward the head-blocks, however much its side, along which the saw is cutting, may have been lightened by taking off boards and slabs.

Fourth, in providing the upright supports to the head-blocks with a lifter, that is arranged to be slid up and down within the upright supports, and to be operated by a lever-handle connected therewith. By a lifter or lifters thus arranged the log can be raised from the carriage, as it is being sawed, if the log is of such form that it would otherwise be liable to interfere with some part of the mill, as, for instance, with the collar to the saw; the use of such lifters also obviating the necessity of slabbing the log upon its under side.

Fifth, in providing the upright supports for the head-blocks with a dog or dogs, that are arranged to move up and down thereon, being attached to and carried by a slide, and also to be swung clear back from the working or bearing-face of the head-blocks. By means of a slide-dog, arranged as above described, the log is enabled to be "dogged" without danger of injury to the saw, as will be obvious from the detailed description to be hereinafter given of the same.

Sixth, in connecting the head-blocks, through a chain or other line, with a mechanism so arranged as to cause the head-blocks to be moved back upon the carriage, as such carriage is being run or "gigged" back, as it is termed; this mechanism being, however, of such arrangement as to allow of its being thrown out of or into action, according as it may be desired, and when in action, by automatically feeding or carrying back the head-blocks through the gigging-back of the carriage, saving time and labor, as is obvious, in the running of a saw-mill.

In the accompanying plate of drawings—

Figure 1 is a plan or top view of a saw-mill carriage, and of a part of the bed in which it is arranged to travel.

Figure 2, a transverse vertical section of the carriage, from the front to the rear side.

Figure 3, a sectional view through the carriage, in the plane of the line $x\,x$, fig. 1.

Figure 4, a view in detail of the slide-dog.

A, in the drawings, represents a saw-mill carriage, which may be of any of the usual forms and constructions. B B², head-blocks arranged on the carriage, the number of which may be either more or less, according to the length of the carriage across which they extend. One, B², of these head-blocks is shown as arranged to be moved upon the carriage, in the direction of its length, and to this head-block, upon each side, rollers or wheels, C, are hung, in position to bear or run upon the side-bars or rails D to the carriage. These rollers, upon the same side of the head-blocks, are hung to the eccentric-ends or portions of a common shaft, E, that is arranged to be turned in the ear-pieces F, fixed to the sides of the head-block. G, a handle fixed to shafts E, for convenience in turning them, and thus, by the eccentricity of their portions or ends, constituting the axles to the wheels in rollers C, causing such rollers to be raised from or lowered to the carriage, according as it is desired that the head-blocks should rest directly upon the carriage, as, for instance, when set in position; or through the rollers or wheels upon the carriage, as, for instance, when the blocks are to be run along upon the carriage, in either one or the other direction, for being adjusted or brought to the proper position with reference to the length of the log to be sawed.

By providing the head-blocks with rollers or wheels, as above described, it is plainly obvious greater freedom and ease of motion are obtained, when to be adjusted, while at the same time, when in position, they can rest solidly and firmly upon the carriage-frame.

H, scrapers fixed to sides of head-block, and arranged thereon to extend over and cover the rollers or wheels C, and from thence down to the carriage, so as to scrape and clear the same, in advance of the movement of the head-blocks, whether it be in either one or the other direction, of whatever saw dust, &c., may have accumulated thereon, which would otherwise, were it allowed to remain, serve to obstruct the movement of the blocks, as above stated. These scrapers, in the present instance, are shown as hinged to the head-blocks, but they may be rigidly fixed, if so desired, and in lieu of scrapers, brushes may be employed for the same purpose, the same effect being accomplished in either case.

The head-blocks B $B^2$ are shown as provided with upright supports or bearings, I $I^2$, for the log to rest or bear against it, when placed upon the head-blocks for being sawed, and one, $I^2$, of these upright supports I $I^2$, is an arrangement of dogs and a lifter, to be now described.

J, a dog, hung by a pivot, $a$, to one side of the upright, $I^2$. This dog J, at one end, terminates in a lever-handle, K, and at its other and lower end is so shaped or sharpened, that it can be made to embed itself in a log upon its under side, when properly operated by the lever-handle K therefor, and thus to hold the log from rolling over toward the uprights, when the side-face of the log, along which the saw is cutting, has been lightened by the cutting of boards and slabs from it.

L, a dog, of the ordinary and common form, hung to uprights, and in position to catch and hold the log upon its upper side, this dog being competent to be used in connection with the dog J, hereinbefore referred to, and provided for holding the log upon its under side.

M, a slide, arranged to move in a vertical groove or way, of the face N, to the upright $I^2$, with which face it is flush, or nearly so. This slide, at its lower end, projects by its right-angular arm, O, beyond the face to the upright; this arm O, when the slide is in its lowest position, being below the surface of the head-block on which the log rests, and thus in no manner obstructing the proper placing or disposition of a log upon the head-blocks. But by this arm, O, if the slide M be raised, the log can be lifted from the head-block if found necessary, in order to prevent its obstructing the operation of the mill, by coming in contact with the collar of the saw or any other working part, because of the knots which it may contain, or its crookedness, or both.

For raising the slide or log-lifter M, a lever-handle, P, is provided, which handle is hung upon a pivot or fulcrum, $b$, in the upright, and at its inner end is provided with a sector-gear, Q, that is engaged with the rack-teeth $c$ to the rear side of the slide or lifter M.

R, a holding-pawl or lever, by which, when set in any one of the notches $d$, in the rear side of upright, the lifter can be held fast at any point desired.

S, a dog, arranged on upright. This pawl S is in two parts, T and U; the one, T, being a bar that is arranged to slide in a vertical way or groove of the upright, and the other, U, the dog proper, consisting of a bar, pivoted at one end to the lower end of slide-bar T, with its other and upper end provided with a prong, W, by which the dog can be engaged with the log, and arranged to pass or swing through the bent-over upper end of the slide bar T. $W^2$, a handle applied to the portion $u$ of dog S, by which handle the dog can be raised at pleasure.

The upper end to the portion $u$ of the dog S is provided with a shoulder, X, by which, when the dog is in its uppermost position, it can be made to rest, and hang upon the rest or shoulder Y, to the upright support, bringing the dog-hook or prong W beyond the face of the said upright.

Z, a pin, fixed in upper end of portion $u$ to dog, by which pin the dog, when in its lowest position, rests upon the shoulder or rest $A^2$ to the upright.

With a dog, S, arranged as above described, as it moves in a fixed plane, it is plainly obvious that the log can be dogged, when somewhat reduced by the cutting of boards from it, without danger of injury to the saw as it is cutting through the log.

In the upright shown as carrying the dogs L S, and lifter M, a slide, $L^2$, is shown, as arranged to be moved to project from the face of the upright, to throw out the log from the upright, to accommodate a taper form, or to bring the front side of the log in the proper position to cut off a slab.

In the present instance the several head-blocks and upright supports are shown as arranged for operation in a manner similar to that described in the reissued Letters Patent granted to me on the 6th day of March, A. D. 1866, by which the upright supports are made to move in conjunction with each other, and in fact, as if one, when properly operated; and it is therefore not deemed necessary to herein particularly describe such arrangement of parts.

$E^2$, a chain, hung at one end to one of the upright supports, from which it extends to the rear side of the carriage, where it is hung to the upper end of a vertical shaft, $F^2$, arranged to turn in bearings upon the rear side rail to the carriage. This shaft, $F^2$, at its lower end, is provided with a friction-pulley, $G^2$, which is in position to run along and upon the edge or side $H^2$, to a bar, $I^4$, placed upon the floor $J^4$ to the mill. This bar, $I^4$, is hung at one end, $K^2$, so as to be swung toward or away from the friction-pulley $G^2$, and thus in the first instance to bring its edge to bear thereon, and thereby, by producing a friction, if the carriage is being gigged back, cause the shaft carrying such pulley to turn and wind upon it the connecting-chain between it and the upright supports, drawing them back upon the head-blocks so as to prepare the blocks to receive another log.

For operating the bar $I^4$, to bring it into position against the friction-pulley, or to release it therefrom, a treadle, $M^2$, is arranged under the flooring $J^4$, with one end in position at the front of the carriage, to be trod upon for operating it, and at the other end connected with the bar $I^4$, through an upright, $N^2$. This treadle, at its rear or inner end, is weighted, so that when the foot is released from it, the treadle will automatically rise, and thus release the bar from the friction-pulley.

By means of the connection to the upright supports above described, as the carriage is being gigged back, if the bar is moved so as to bear upon the friction-pulley, the said uprights can be thereby drawn back upon the head-blocks, either more or less, as may be desired. This arrangement is of much importance when a log has been completely sawed, and a fresh log is to be placed upon the carriage, as it saves both time and labor in the running of a mill.

What I claim as my invention, and desire to secure by Letters Patent, is—

1. The rollers or wheels C, supporting the head-block, and mounted on shafts eccentric to them, by which the wheels are forced upon the carriage or released from bearing thereon, constructed and operated as described.

2. The scrapers H, hinged to the head-block, for the purpose of clearing the face of the carriage side from saw-dust, constructed and operated substantially as described.

3. The chain-connection E, attached to the upright supports, and operated by means of a friction-pulley, $G^2$, upon a bar, $I^4$, through a treadle, $M^4$, by which, as the carriage is gigged back, the supports will be drawn back on the carriage, constructed and operating substantially as described.

DENNIS LANE.

Witnesses:
JACOB HENRY,
LOUIS BRODHEAD.